(12) United States Patent
Cingolani

(10) Patent No.: US 11,439,270 B2
(45) Date of Patent: Sep. 13, 2022

(54) COFFEE MACHINE WITH PROPORTIONAL PRE-INFUSION SYSTEM

(71) Applicant: SIMONELLI GROUP S.P.A., Belforte del Chienti (IT)

(72) Inventor: Claudio Cingolani, Camerino (IT)

(*) Notice: Subject to any disclaimer, the term of this patent is extended or adjusted under 35 U.S.C. 154(b) by 560 days.

(21) Appl. No.: 16/680,003

(22) Filed: Nov. 11, 2019

(65) Prior Publication Data

US 2020/0170441 A1    Jun. 4, 2020

(30) Foreign Application Priority Data

Nov. 29, 2018 (IT) .................. 102018000010697

(51) Int. Cl.

| | |
|---|---|
| *A47J 31/46* | (2006.01) |
| *A23F 5/26* | (2006.01) |
| *A47J 31/44* | (2006.01) |
| *A47J 31/52* | (2006.01) |
| *A47J 31/54* | (2006.01) |
| *A47J 31/00* | (2006.01) |
| *A47J 31/36* | (2006.01) |
| *A23F 5/24* | (2006.01) |

(52) U.S. Cl.
CPC .............. *A47J 31/461* (2018.08); *A23F 5/26* (2013.01); *A23F 5/262* (2013.01); *A47J 31/002* (2013.01); *A47J 31/36* (2013.01); *A47J 31/446* (2013.01); *A47J 31/468* (2018.08); *A47J 31/52* (2013.01); *A47J 31/545* (2013.01); *A23F 5/243* (2013.01); *A47J 31/469* (2018.08)

(58) Field of Classification Search
CPC .......... A47J 31/002; A47J 31/34; A47J 31/36; A47J 31/461; A47J 31/468; A47J 31/469; A23F 5/24; A23F 5/243; A23F 5/26
See application file for complete search history.

(56) References Cited

U.S. PATENT DOCUMENTS

| | | |
|---|---|---|
| 7,654,191 B2 | 2/2010 | Greenwald et al. |
| 2011/0097454 A1 | 4/2011 | Coccia |

(Continued)

FOREIGN PATENT DOCUMENTS

| | | |
|---|---|---|
| EP | 0934719 A1 | 8/1999 |
| EP | 2959808 A1 | 12/2015 |

(Continued)

OTHER PUBLICATIONS

Search Report and Written Opinion from Italian Priority Application No. 102018000010697; dated Jul. 11, 2019.

*Primary Examiner* — Reginald Alexander
(74) *Attorney, Agent, or Firm* — Egbert, McDaniel & Swartz, PLLC

(57) ABSTRACT

A coffee machine includes: a filter holder suitable for containing at least one coffee dose; a dispensing unit with dispensing nozzles suitable for sending a flow of hot water on the coffee dose; a water system provided with a pump to supply pressurized water towards the dispensing nozzles; a heater to heat the water to be supplied to the dispensing nozzles; a dispensing valve to enable/disable the supply of hot water towards the dispensing nozzles; a pre-infusion valve installed upstream the dispensing valve; and a control unit comprising actuation means to actuate the pre-infusion valve. The pre-infusion valve is a two-way electrovalve of programmable proportional type.

8 Claims, 3 Drawing Sheets

(56) References Cited

U.S. PATENT DOCUMENTS

| | | | | |
|---|---|---|---|---|
| 2016/0249761 A1* | 9/2016 | Llopis | ............... | A47J 31/0576 |
| | | | | 99/282 |
| 2016/0287007 A1* | 10/2016 | Barnett | ............... | A47J 31/5253 |
| 2019/0014942 A1* | 1/2019 | Juve | ............... | A47J 31/002 |
| 2019/0298101 A1* | 10/2019 | Prefontaine | ............ | A47J 31/34 |
| 2020/0352390 A1* | 11/2020 | Ceotto | ............... | A47J 31/52 |

FOREIGN PATENT DOCUMENTS

| | | |
|---|---|---|
| WO | 2012146660 A1 | 11/2012 |
| WO | 2015015370 A1 | 2/2015 |

\* cited by examiner

COFFEE MACHINE WITH PROPORTIONAL PRE-INFUSION SYSTEM

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present patent application for industrial invention relates to a coffee machine with a proportional pre-infusion system.

2. Description of Related Art Including Information Disclosed Under 37 CFR 1.97 and 37 CFR 1.98

As it is known, a coffee machine comprises a filter holder where compressed ground coffee is disposed. The filter holder with the coffee dose is disposed under a dispensing unit of the machine. The dispensing unit has dispensing nozzles connected to a water system that supplies hot water at a high pressure (approximately 9-11 bars). However, it was demonstrated that, with such a high pressure (9-11 bar) of the hot water, the water flow in the coffee dose is reduced, and not increased, because of the excessive compression of the coffee dose due to an excessive migration of the fines (i.e. the finest coffee particles). For this reason, the extraction of the beverage is not efficient.

EP2959808 discloses a solution to this technical problem, which provides for getting the coffee dose wet (pre-infusion) before dispensing the pressurized hot water. In view of the above, the wet coffee is less compressed by the pressure of the hot water and the flow of hot water is increased, obtaining a more efficient extraction compared to the case without pre-infusion.

EP2959808 discloses a coffee machine comprising:
a source of pressurized water;
a heater connected to the source of pressurized water and to the dispensing nozzles;
a dispensing valve disposed between the heater and the dispensing nozzles; and
an additional valve disposed between the source of pressurized water and the heater.

In order to perform the pre-infusion, the additional valve is closed, the dispensing valve is closed and the water in the heater is heated in such a way to obtain a slight pressure increase that is sufficient for a minimum amount of water to be ejected from the heater, going towards the dispensing nozzles. Then, only the dispensing valve is opened and a small amount of water with low pressure is ejected from the heater in order to reach and soak the coffee dose through the dispensing nozzles. Throughout the pre-infusion process, the additional valve is kept closed. When the pre-infusion process is completed, the additional valve is opened and the pressurized water reaches the coffee dose, extracting the beverage.

Such a pre-infusion system of the prior art is impaired by some drawbacks because of the time needed to completely heat the water in the heater. Moreover, by getting the coffee dose completely and continuously wet during the pre-infusions step, the pre-infusion is not perfect and efficiency problems are encountered during the extraction of the beverage.

US2011/097454 discloses a coffee machine provided with a system for controlling the dispensed pressure, i.e. the pressure of the water supplied in the filter that contains the ground coffee.

BRIEF SUMMARY OF THE INVENTION

The purpose of the present invention is to eliminate the drawbacks of the prior art by disclosing a coffee machine with a pre-infusion system that is rapid, efficient, versatile, reliable, inexpensive and easy to make.

These purposes are achieved according to the invention with the characteristics of the independent claim 1.

Advantageous embodiments of the invention appear from the dependent claims.

After performing several experimental tests, the applicant has surprisingly discovered that a perfect pre-infusion of the coffee dose in the filter holder can be obtained by soaking the coffee dose with a proportional flow of pressurized hot water that provides for gradually increasing the flow up to a maximum value and for gradually decreasing the flow until the dispensing operation is interrupted. In fact, a settlement and a relaxation of the coffee dose are obtained during the gradual decrease of the water flow. Such a relaxation of the coffee dose creates a counter-pressure that successively determines an increase of the water flow through the coffee during the extraction of the beverage, thus achieving a higher efficiency.

Such a result is obtained by installing a pre-infusion valve of programmable proportional type in the water system that supplies the dispensing nozzles of the dispensing unit. Such a pre-infusion valve is a proportional electrovalve provided with a shutter that is suitable for partially and gradually opening and closing the communication in the water system.

Advantageously, such a proportional electrovalve is programmed in such a way to make at least two water dispensing operations that are separated by time intervals in which no water is dispensed.

BRIEF DESCRIPTION OF THE SEVERAL VIEWS OF THE DRAWINGS

Additional features of the invention will appear clearer from the following description, which refers to merely illustrative, not limiting embodiments, as illustrated in the appended drawings, wherein.

DETAILED DESCRIPTION OF THE INVENTION

Figure 1:
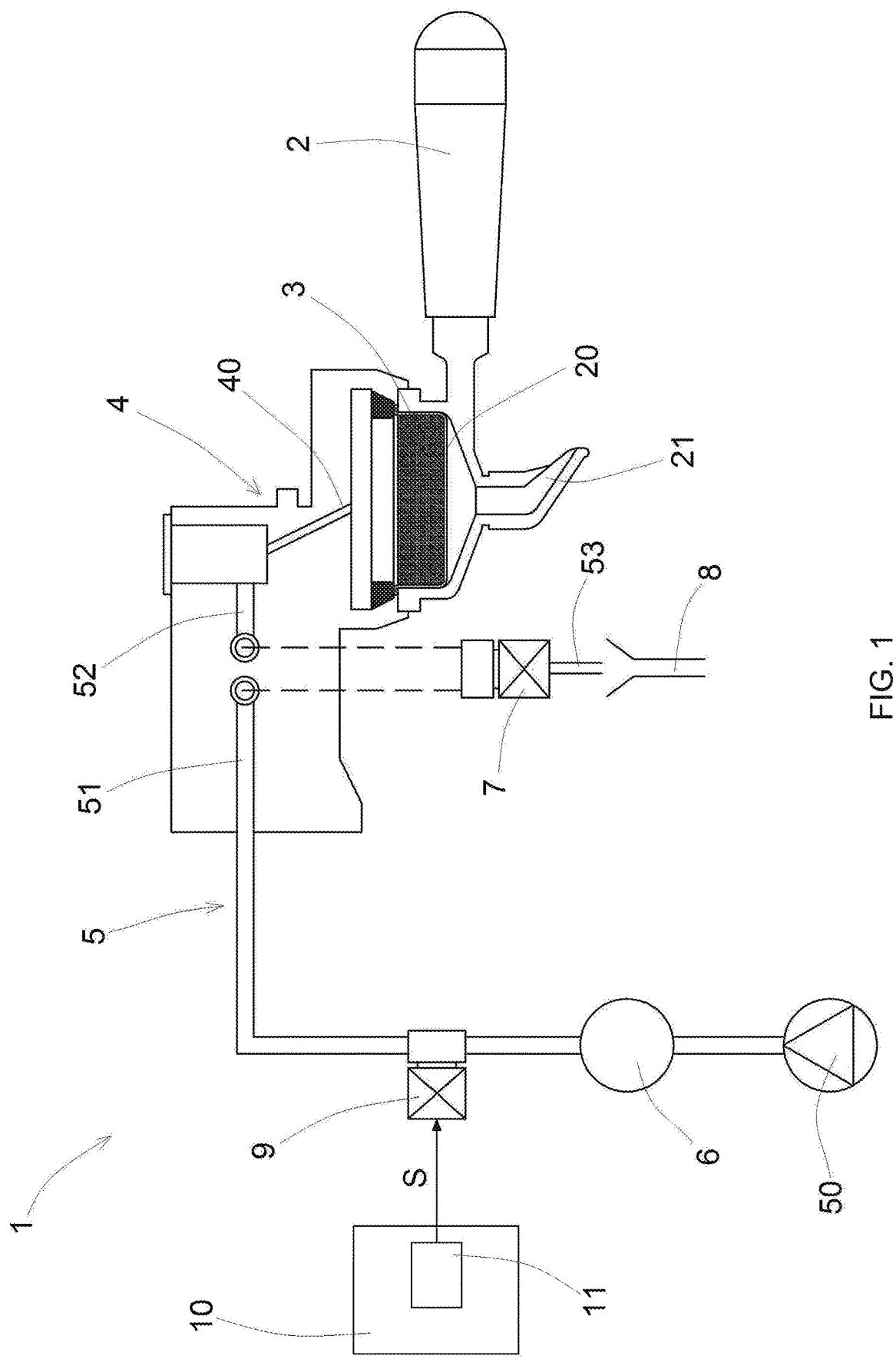
FIG. 1 is a block diagram that diagrammatically illustrates a first embodiment of a coffee machine according to the invention.

With reference to the Figures, a coffee machine according to the invention is disclosed, which is generally indicated with reference numeral 1.

Figure 2:
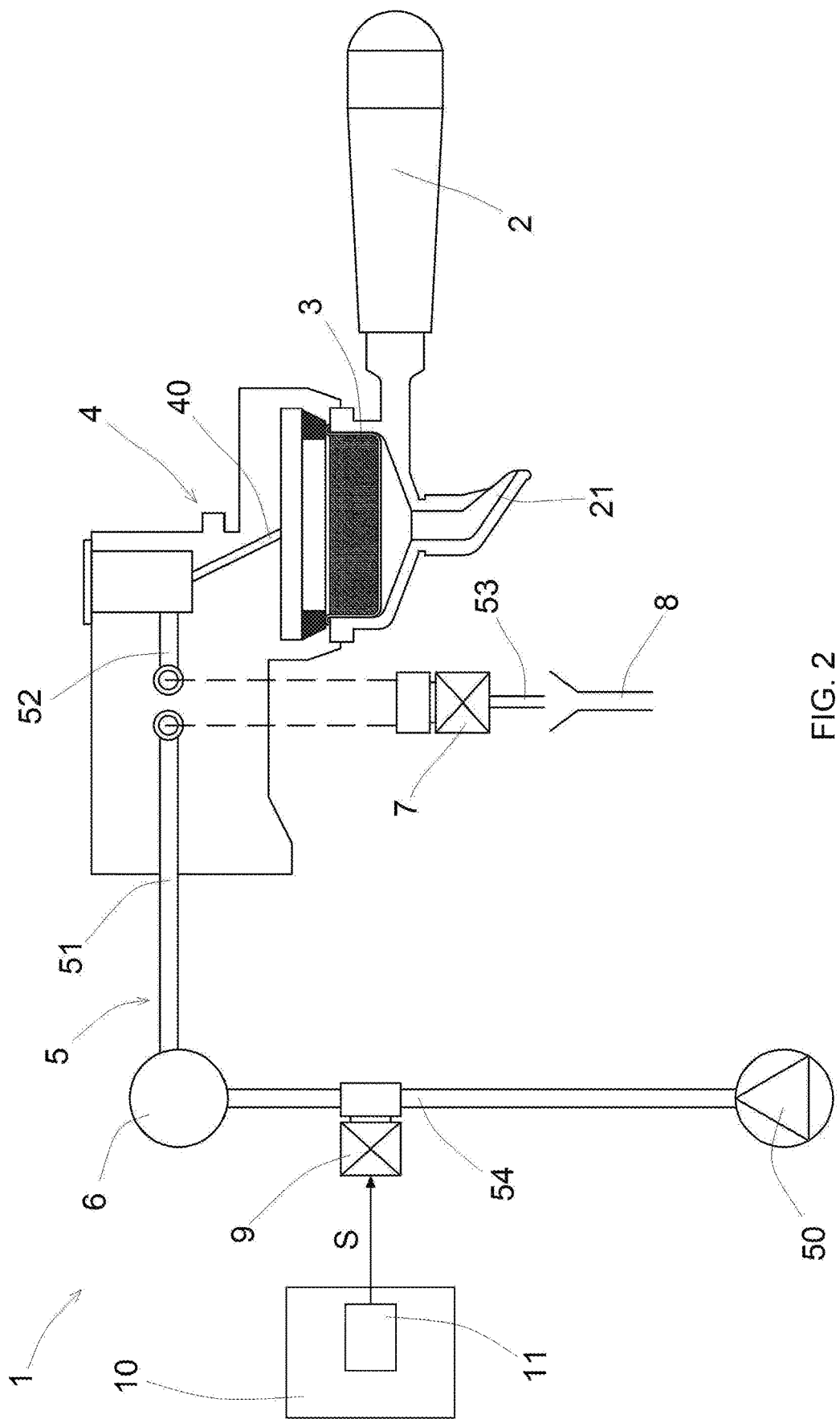
FIG. 2 is a block diagram that diagrammatically illustrates a second embodiment of a coffee machine according to the invention.

With reference to FIGS. 1 and 2, the coffee machine (1) comprises a filter holder (2) with a housing (20) suitable for receiving one or more coffee doses (3). The coffee is in the form of ground coffee or powder coffee and is compressed in the housing (20) of the filter holder. The filter holder (2) has an extraction nozzle (21) in communication with the housing (20) from where the beverage is extracted.

The filter holder (2) is disposed in a dispensing unit (4) with dispensing nozzles (40) to supply the coffee dose (3) with hot water.

The dispensing nozzles (40) of the dispensing unit are connected to a water system (5). The water system (5) comprises a pump (50) suitable for supplying pressurized water at a pressure of approximately 9-11 bar, generally from a tank (not shown in the figures).

A heater (6) is disposed in the water system (5) between the pump (50) and the dispensing nozzles (40) of the dispensing unit. The heater (6) is suitable for heating the water to a temperature of approximately 88°-96° C., i.e. a temperature that is suitable for extracting the beverage.

Therefore, in the water system (5), the water upstream the heater (6) is cold, whereas the water downstream the heater (6) is hot, with a temperature of approximately 88°-96° C.

A dispensing valve (7) is disposed in the dispensing unit (4) to enable or disable the supply of water from the water system (5) towards the dispensing nozzles (40) of the dispensing unit.

The dispensing valve (7) is a three-way electrovalve and is connected to three ducts:

- an inlet duct (51) in communication with the water system (5),
- an outlet duct (52) in communication with the dispensing nozzles (40),
- a draining duct (53) in communication with a drain (8).

During the extraction of the beverage, the dispensing valve (7) opens the communication between the inlet duct (51) and the outlet duct (52) and closes the communication with the draining duct (53). When the dispensing operation is completed, the dispensing valve (7) opens the communication between the outlet duct (52) and the draining duct (53) and closes the communication with the inlet duct (51). In view of the above, at the end of the extraction, the water that remains between the coffee dose (3) and the dispensing unit (4) is drained, in such a way to eliminate the pressure in this area of the dispensing unit and permit the removal of the filter holder (2) without any leaks of pressurized water from the water system (5).

According to the invention, a pre-infusion valve (9) is disposed in the water system (5) upstream the dispensing valve (7).

According to the first embodiment of FIG. 1, the pre-infusion valve (9) is disposed downstream the heater (6), i.e. in the inlet duct (51) that contains hot water at a temperature of 88°-96° C.

According to the second embodiment of FIG. 2, the pre-infusion valve (9) is disposed upstream the heater (6), i.e. in a duct (54) that contains cold water. The duct (54) is disposed between the pump (50) and the heater (6).

The pre-infusion valve (9) is a two-way electrovalve of programmable proportional type. Otherwise said, the pre-infusion valve (9) has a shutter that is suitable for partially and gradually opening and closing the communication between the two ways of the valve.

The pre-infusion valve (9) is connected to a control unit (10) of the coffee machine provided with actuation means (11) suitable for sending a command signal (S) to the pre-infusion valve (9) in such a way to gradually move the shutter of the valve proportionally to the command signal (S) to obtain a gradual opening of the valve until the valve is completely opened, and a gradual closing of the valve until the valve is completely closed.

For illustrative purposes, the pre-infusion valve (9) can be a voltage-controlled proportional electrovalve. In such a case, the actuation means (11) are a variable voltage generator and the command signal (S) is a variable voltage signal suitable for supplying the pre-infusion valve with a variable voltage proportionally to the opening of the pre-infusion valve to be obtained.

The pre-infusion valve (9) can be a frequency-controlled proportional electrovalve. In such a case, the actuation means (11) are a generator of alternate current at variable frequency and the command signal (S) is an alternate current signal with variable frequency, which is suitable for supplying the pre-infusion valve with an alternate current with variable frequency proportionally to the opening of the pre-infusion valve to be obtained.

The pre-infusion valve can be an electrovalve provided with a stepping motor that actuates the shutter. In such a case, the actuation means (11) are a driver of the stepping motor and the command signal (S) is a current signal or a voltage signal that regulates the rotation of the stepping motor proportionally to the opening of the valve to be obtained. In such a case, the motor is provided with an encoder to control the displacement speed and the position of the shutter of the valve.

Figure 3:
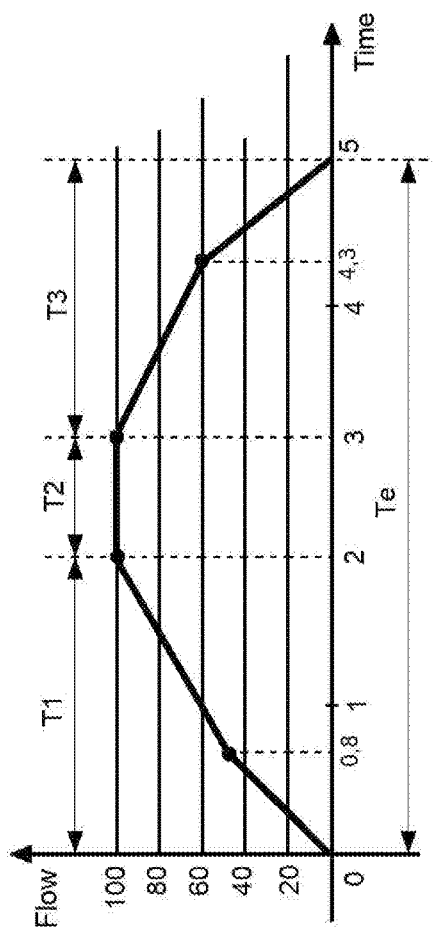
FIG. 3 is chart with the time value in seconds on the abscissa axis, and the flow percentage on the ordinate axis, which illustrates the trend of the flow as a function of the time during a dispensing time of the pre-infusion valve.

FIG. 3 illustrates an example in which the pre-infusion valve (9) is programmed in such a way to have a dispensing time (Te) of 5 seconds, in which the valve is opened and closed gradually.

Starting from a time 0, the valve starts opening gradually;
- after 0.8 seconds, the valve is partially open in such a way to obtain a flow of 40% relative to the maximum flow obtained when the valve is completely opened;
- after 2 seconds, the valve is completely open in such a way to permit the maximum flow;
- the valve is kept completely open for 1 second;
- after 3 seconds, the valve starts closing gradually;
- after 4.3 seconds, the valve is partially closed in such a way to permit a flow of 60% relative to the maximum flow obtained when the valve is completely open; and
- after 5 seconds, the valve is completely closed and the flow is interrupted.

The pre-infusion valve (9) is configured in such a way to have:
- a dispensing time (Te) from the moment when the valve is opened to the moment when the valve is closed,
- an opening time (T1) from the moment when the valve starts opening to the moment when the valve is completely open,
- a maximum flow time (T2) in which the pre-infusion valve is completely open,
- a closing time (T3) from the moment when the valve starts closing to the moment when the valve is completely closed.

Advantageously, the actuation means (11) control the pre-infusion valve in such a way that the opening time (T1) is higher than ⅓ of the dispensing time (Te), the maximum flow time (T2) is lower than ⅓ of the dispensing time (Te), and the closing time (T2) is higher than ⅓ of the dispensing time (Te). For illustrative purposes, the opening time (T1) is approximately ⅖ of the dispensing time, the maximum flow time (T2) is approximately ⅕ of the dispensing time and the closing time is approximately ⅖ of the dispensing time.

The dispensing time (Te), the opening time (T1), the maximum flow time (T2) and the closing time (T3) of the pre-infusion valve can be set by means of the control unit (10).

It must be noted that the water is supplied by the pre-infusion valve (9) at a high pressure (9-11 bar). However, because of the gradual opening of the valve, the water that reaches the coffee dose (3) is not sufficient to compress the coffee powder and because of the gradual closing of the valve, the time in which the coffee is soaked with water is sufficient to cause the relaxation of the coffee powder.

As shown in FIG. 3, during a pre-infusion cycle, the pre-infusion valve makes only one dispensing operation that lasts 5 seconds in total.

Advantageously, the pre-infusion valve (9) can be programmed in such a way that, during a pre-infusion cycle, the valve makes at least two dispensing operations that are separated by an idle time interval in which the valve is completely closed.

Figure 4:
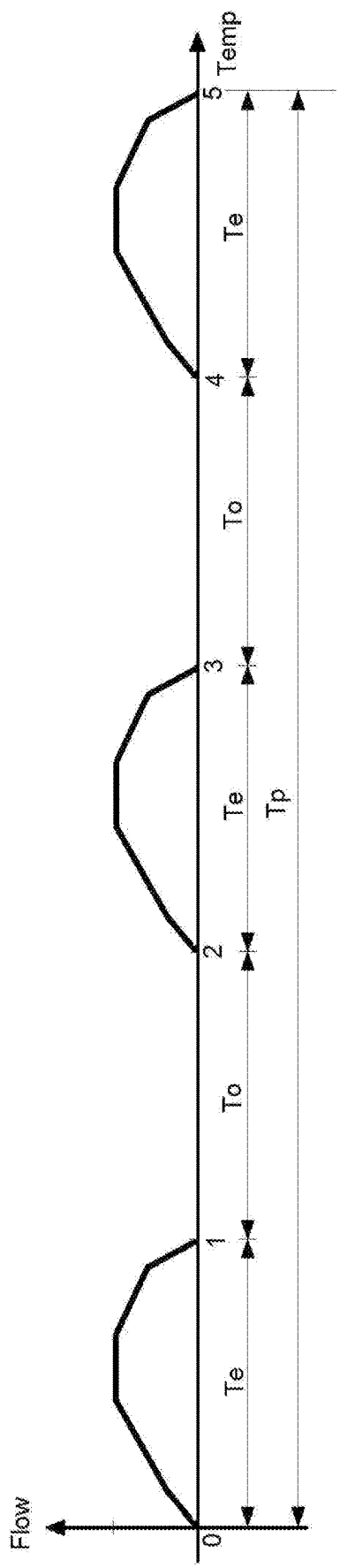
FIG. 4 is the same chart as FIG. 3, which illustrates the trend of the flow as a function of the time during a pre-infusion cycle of the pre-infusion valve.

FIG. 4 illustrates an example in which the pre-infusion valve (9) is programmed for a pre-infusion cycle with a duration (Tp) of 5 seconds that comprises three dispensing times (Te) separated by idle times (To). Each dispensing time (Te) lasts 1 second and each idle time (To) lasts 1 second. The number and the frequency of the dispensing times during a pre-infusion period (Te) are set by means of the control unit (10).

During the idle times (To) in which no water is supplied to the coffee dose (3), the coffee is settled and relaxed; successively, hot water is supplied with a gradually increasing and a gradually decreasing flow that soaks the coffee. Such a system prevents the excessive compression of the coffee that would hinder a high pressure flow.

When the pre-infusion time ends, the pre-infusion valve (9) can be kept totally or partially open, in such a way that a continuous flow of hot water reaches the pre-infused coffee dose for extracting the beverage.

Alternatively, the pre-infusion valve (9) can operate in alternate mode, also during the extraction of the beverage. In fact, it was noted that by operating the pre-infusion valve (9) in alternate mode, by alternating dispensing times (Te) with a duration of 1 second with idle times (To) with a duration of 1 second, after approximately 5 seconds, the beverage is perfectly extracted, without creating any hindrances to the extraction of the beverage.

It must be noted that the dispensing valve (7) is kept open for the entire duration of the pre-infusion of the coffee and the extraction of the beverage. Instead, the pre-infusion valve (9) operates at least for the pre-infusion period which must have a minimum duration of 4 seconds. When the pre-infusion period ends, the pre-infusion valve (9) can be kept open to permit extraction with continuous flow, or can operate in alternate mode to permit extraction with intermittent flow.

It must be noted that the function of the pre-infusion valve (9) cannot be performed by the dispensing valve (7) because the dispensing valve (7) cannot operate either in proportional mode or in alternate mode. In fact, the dispensing valve (7) is a three-way valve of ON/OFF type, which only permits a total closing or a total opening of one or more ways. The third way of the dispensing valve (7) is connected to the draining duct (53) that goes to the drain (8). Therefore, by opening and closing the dispensing valve (7) in alternate mode during the pre-infusion or dispensing step, during the first extraction steps, the water in contact with the coffee dose (3) would be conveyed towards the drain (8). In this way, the substances and the aromas that are partially dissolved and extracted by the water would be eliminated from the coffee dose (3), and said substances and aromas would not be extracted by the extraction nozzle (21) of the filter holder while passing through the coffee dose.

Because of the provision of the two-way pre-infusion valve (9), the water system (5) and the area of the dispensing unit (4) that contains the coffee dose (3) can be always full, increasing and decreasing the pressure of the water on the coffee dose, without water leaks towards the drain (8) during the extraction of the beverage.

Numerous equivalent variations and modifications can be made to the present embodiments of the invention, which are within the reach of an expert of the field, falling in any case within the scope of the invention.

I claim:

1. Coffee machine comprising:
   a filter holder suitable for containing at least one coffee dose;
   a dispensing unit suitable for receiving the filter holder; said dispensing unit being provided with dispensing nozzles suitable for sending a flow of hot water on the coffee dose contained in the filter holder;
   a water system provided with a pump to supply pressurized water to said dispensing nozzles of the dispensing unit;
   a heater disposed in said water system to heat the water to be supplied to the dispensing nozzles;
   a dispensing valve disposed in said water system between the heater and the dispensing nozzles to enable/disable the supply of hot water to said dispensing nozzles;
   a pre-infusion valve disposed in said water system upstream said dispensing valve; and
   a control unit comprising actuation means to actuate said pre-infusion valve;
   wherein said pre-infusion valve is a two-way electrovalve of programmable proportional type, comprising a shutter suitable for gradually opening and closing the communication between the two ways of the valve proportionally to a command signal sent by said actuation means;
   wherein the actuation means and the pre-infusion valve are configured in such a way to have:
     a dispensing time (Te) from the moment when the pre-infusion valve is opened to the moment when the pre-infusion valve is closed;
     an opening time (T1) from the moment when the pre-infusion valve starts opening to the moment when the pre-infusion valve is completely open;
     a maximum flow time (T2) in which the pre-infusion valve is completely open; and
     a closing time (T3) from the moment when the pre-infusion valve starts closing to the moment when the pre-infusion valve is completely closed;
   wherein the closing time (T1) is higher than ⅓ of the dispensing time (Te), the maximum flow time (T2) is lower than ⅓ of the dispensing time (Te), and the closing time (T2) is higher than ⅓ of the dispensing time (Te).

2. The coffee machine of claim 1, wherein the opening time (T1) is approximately ⅖ of the dispensing time (Te), the maximum flow time (T2) is approximately ⅕ of the dispensing time (Te) and the closing time (T3) is approximately ⅖ of the dispensing time (Te).

3. The coffee machine of claim 1, wherein the actuation means and the pre-infusion valve are configured in such a way that the pre-infusion valve (9) makes only one dispensing operation during a pre-infusion cycle.

4. The coffee machine of claim 1, wherein the actuation means and the pre-infusion valve are configured in such a way that, during a pre-infusion cycle, the pre-infusion valve makes at least two dispensing operations that are separated by an idle time interval in which the valve is completely closed.

5. The coffee machine of claim 1, wherein the pre-infusion valve is a proportional electrovalve with voltage or frequency control and the actuation means are a generator of variable voltage or alternate current and the control signal is a signal of variable voltage or alternate current with variable frequency, suitable for supplying the pre-infusion valve with a variable voltage or alternate current with variable frequency proportionally to the opening of the pre-infusion valve to be obtained.

6. The coffee machine of any one of claims 1, wherein the pre-infusion valve is an electrovalve provided with a stepping motor that actuates the shutter; the actuation means are a driver of the stepping motor and the control signal is a current or voltage signal that controls the rotation of the stepping motor proportionally to the opening of the pre-infusion valve to be obtained.

7. The coffee machine of claim 1, wherein the pre-infusion valve is installed downstream or upstream said heater.

8. Coffee extraction method with a coffee machine comprising the following steps:
  pre-infusion of a coffee dose contained in a filter holder by supplying a flow of pressurized hot water on the coffee dose;
  extraction of the beverage by supplying a flow of pressurized hot water;
  wherein
    said pre-infusion step is performed by means of a pre-infusion valve comprising a two-way electrovalve ofprogrammable proportional type, comprising a shutter suitable for gradually opening and closing the communication between the two ways of the valve, proportionally to a command signal sent by actuation means;
  said method comprises:
    a dispensing time (Te) from the moment when the pre-infusion valve is opened to the moment when the pre-infusion valve is closed;
    an opening time (T1) from the moment when the pre-infusion valve starts opening to the moment when the pre-infusion valve is completely open;
    a maximum flow time (T2) in which the pre-infusion valve is completely open; and
    a closing time (T3) from the moment when the pre-infusion valve starts closing to the moment when the pre-infusion valve is completely closed;
  wherein the opening time (T1) is higher than ⅓ of the dispensing time (Te), the maximum flow time (T2) is lower than ⅓ of the dispensing time (Te), and the closing time (T2) is higher than ⅓ of the dispensing time (Te).

* * * * *